(12) United States Patent  
Finley

(10) Patent No.: US 6,343,693 B1  
(45) Date of Patent: Feb. 5, 2002

(54) CABLE TIE DISPENSER

(76) Inventor: Allen D. Finley, 837 - 25$^{th}$ St., SE., Rochester, MN (US) 55904

(*) Notice: Subject to any disclaimer, the term of this patent is extended or adjusted under 35 U.S.C. 154(b) by 0 days.

(21) Appl. No.: 09/550,368

(22) Filed: Apr. 19, 2000

(51) Int. Cl.$^7$ ................................................. A44B 9/12
(52) U.S. Cl. ..................... 206/338; 206/523; 24/336
(58) Field of Search ................................ 206/523, 338, 206/340, 38, 472, 443, 446; 220/4.22, 4.23, 4.24; 24/336, 339, 287; 211/60.1, 49.1

(56) References Cited

U.S. PATENT DOCUMENTS

| | | | | |
|---|---|---|---|---|
| 1,121,232 A | * | 12/1914 | Davis | 206/443 |
| 4,446,900 A | * | 5/1984 | Markovich | 206/317 |
| 4,526,756 A | * | 7/1985 | Wong | 206/443 |
| 4,637,097 A | * | 1/1987 | Secord | 206/446 |
| 4,790,225 A | | 12/1988 | Moody | |
| 4,836,374 A | * | 6/1989 | Hutchins et al. | 206/373 |
| 4,955,480 A | * | 9/1990 | Sexton | 206/528 |
| 5,029,669 A | * | 7/1991 | Insley et al. | 206/204 |
| 5,144,989 A | | 9/1992 | Mika | |
| 5,601,194 A | * | 2/1997 | Brinston | 211/60.1 |
| 5,794,773 A | * | 8/1998 | Moyer | 206/315.91 |
| 5,845,809 A | * | 12/1998 | Garrett et al. | 220/724 |
| 5,967,316 A | * | 10/1999 | Abbruzzese et al. | 206/343 |
| 6,023,023 A | * | 2/2000 | Takeuchi | 174/92 |
| D436,421 S | * | 1/2001 | Cooper | D28/77 |

* cited by examiner

Primary Examiner—Shian Luong  
(74) Attorney, Agent, or Firm—Henderson & Sturm LLP

(57) ABSTRACT

A cable tie dispenser which can hold a plurality of individual cable ties and which allows removal of individual cable ties therefrom while firmly holding the remaining plurality of cable ties. The cable tie dispenser includes an area of compressible resilient material which is compressed within the case of the dispenser around at least a portion of the length the cable ties. The area of compressible resilient material thereby firmly but removably restrains the plurality of individual cable ties within the dispenser with an end of each of the cable ties extending above the edge of the area of compressible resilient material such that individual cable ties may be grasped and removed for use. As the individual cable ties are removed from the dispenser, the compressible resilient material expands to fill the void left by the removed cable ties. Thus, the compressible resilient material maintains a firm and substantially uniform pressure on all the remaining cable ties within the dispenser such that even the last cable tie remaining within the dispenser is firmly restrained and will not fall out of the dispenser until it is purposefully removed.

21 Claims, 3 Drawing Sheets

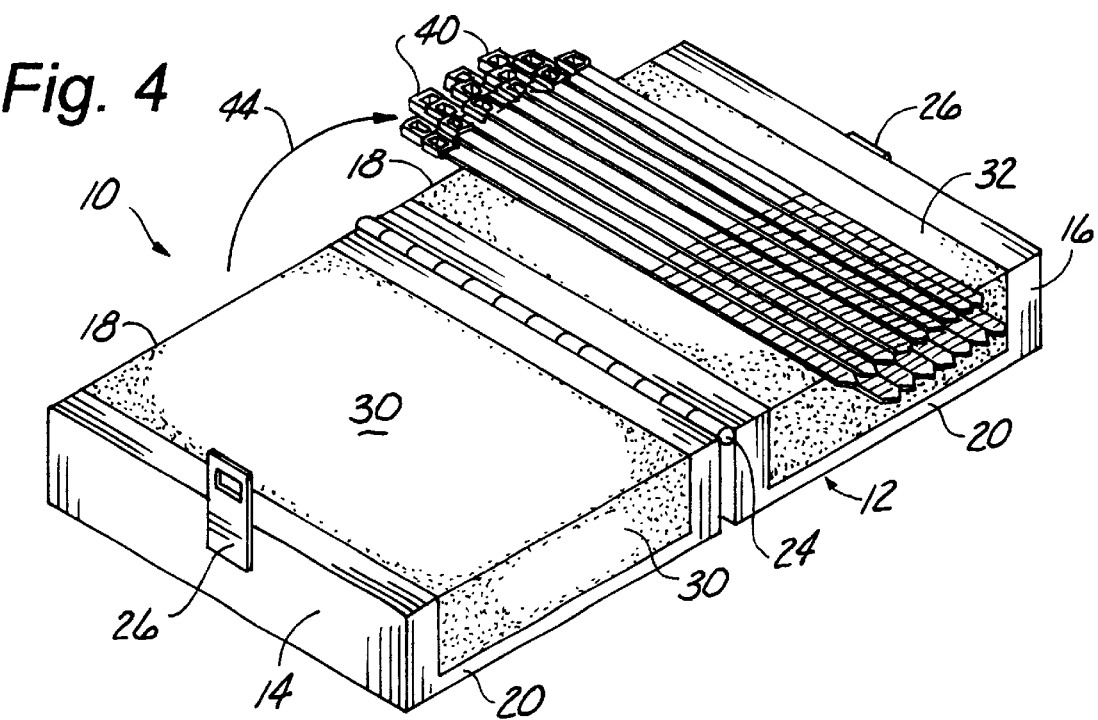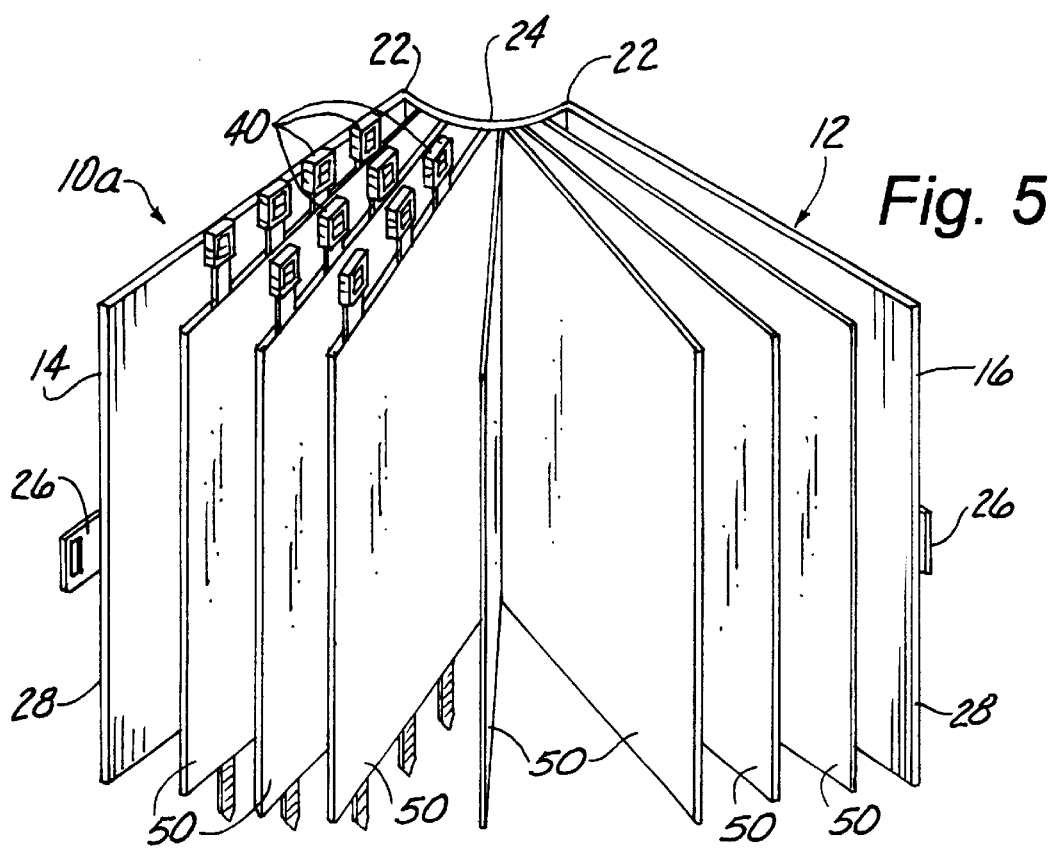

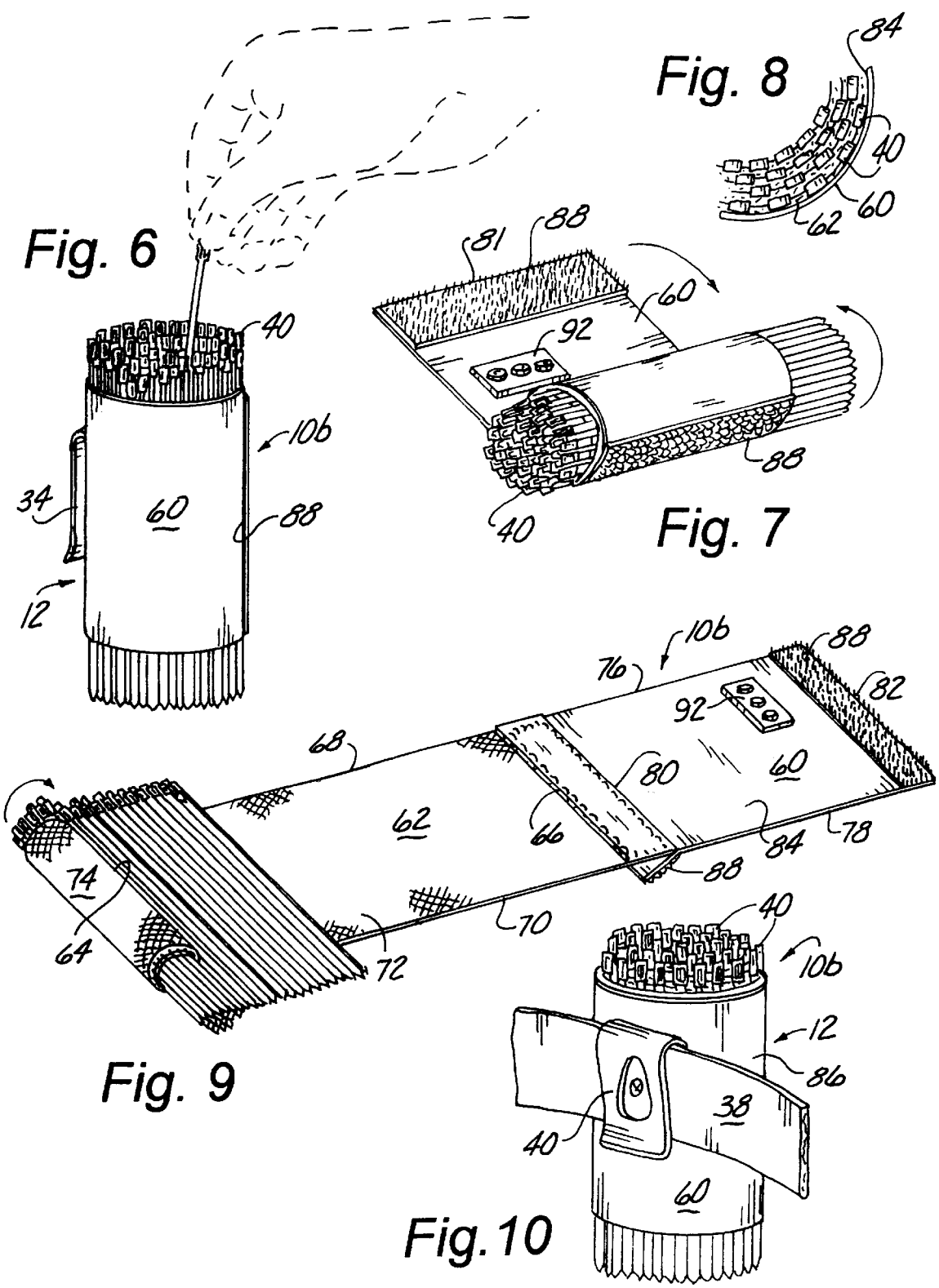

CABLE TIE DISPENSER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of dispensers, and more particularly to a device for dispensing individual cable ties to a user.

2. Description of Related Art

As can be seen by reference to the following U.S. Pat. Nos. 4,790,225 and 5,144,989 the prior art discloses complex devices for dispensing cable ties from a continuous ribbon.

While all of the aforementioned prior art constructions are more than adequate for the basic purpose and function for which they have been specifically designed, they are uniformly deficient with respect to their failure to provide a simple, efficient, and practical device for dispensing individual cable ties to a user.

As a consequence of the foregoing situation, there has existed a longstanding need for a new and improved cable tie dispenser and the provision of such a construction is a stated objective of the present invention.

BRIEF SUMMARY OF THE INVENTION

Briefly stated, the present invention provides a cable tie dispenser which includes an area of compressible resilient material which is compressed within the dispenser around a length of a supply of cable ties. The compressible resilient material thereby firmly but removably restrains the supply of cable ties within the dispenser with an end of each of the cable ties extending above the edge of the compressible resilient material such that individual cable ties may be grasped and removed for use. As the individual cable ties are removed from the dispenser, the compressible resilient material expands to fill the void left by the removed cable ties. Thus, the compressible resilient material maintains a firm and substantially uniform pressure on all the remaining cable ties within the dispenser such that even the last cable tie remaining within the dispenser is firmly restrained and will not fall out of the dispenser until it is purposefully removed.

A preferred embodiment of the above described cable tie dispenser is comprised of a hinged case which can be opened like a book. Disposed on each side of the hinged case is an area of compressible resilient material, such that when the case is closed the compressible resilient material is in an adjacently opposed relation. A fastener holds the two halves of the case together. A belt clip is preferably disposed on one side of the hinged case so that an individual can removably attach the dispenser to his or her belt. In use, the hinged case is opened to receive a supply of cable ties. One end of the cable ties, preferably the head, extends above the edge of the compressible resilient material. The halves of the hinged case is then closed and held together by the fastener. As the hinged case is being closed, the compressible resilient material is compressed by the cable ties disposed therebetween. As explained above, the compressible resilient material thereby firmly but removably restrains the supply of cable ties within the dispenser with an end of each of the cable ties extending above the edge of the compressible resilient material such that individual cable ties may be grasped and removed for use.

In another embodiment the cable tie dispenser is comprised of an elongated flexible sheet of compressible resilient material and an attached flexible panel with complementary fasteners at each end of the panel. A supply of cable ties is placed across the width and along the length of the flexible sheet such that at least one end of the cable ties, preferably the head, extends above the upper edge of the sheet. The flexible sheet is then tightly rolled up to enclose the cable ties within a cylindrical wrap. Continued rolling of the wrap over the attached panel forms a cylindrical container for the wrap and cable ties that are secured by the complementary fasteners. A belt clip is attached to the exterior of the container to provide convenient access for the user. As explained above, selected individual ties can thereby be removed while maintaining the remaining cable ties within the dispenser.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 4 is a perspective view showing the dispenser of FIG. 1 loaded with cable ties;

FIG. 5 is a perspective view showing another embodiment of the cable tie dispenser of the present invention with cable ties disposed between pages of compressible resilient material;

FIG. 6 is a perspective view showing another embodiment of the cable tie dispenser of the present invention in use;

FIG. 7 is a perspective view illustrating the dispenser of FIG. 4 being rolled up;

FIG. 8 is a partial top plan view of the FIG. 4 embodiment showing the cable ties dispersed between the rolled up layers of the flexible sheet of compressible resilient material;

FIG. 9 is a perspective view of the dispenser of FIG. 4 illustrating cable ties placed across the width and along the length of the flexible sheet in the process of being rolled up to form the cylindrical wrap; and FIG. 10 is a perspective view of the dispenser of FIG. 4 attached to a user's belt.

DETAILED DESCRIPTION OF THE INVENTION

Figure 1:
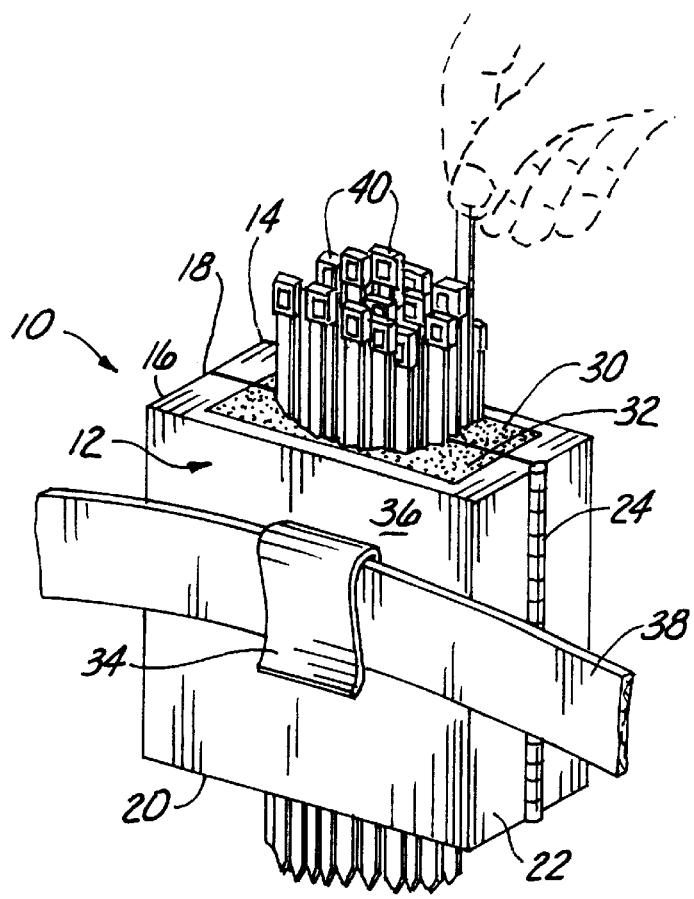
FIG. 1 is a perspective view showing one embodiment of the cable tie dispenser of the present invention in use.
Figure 2:
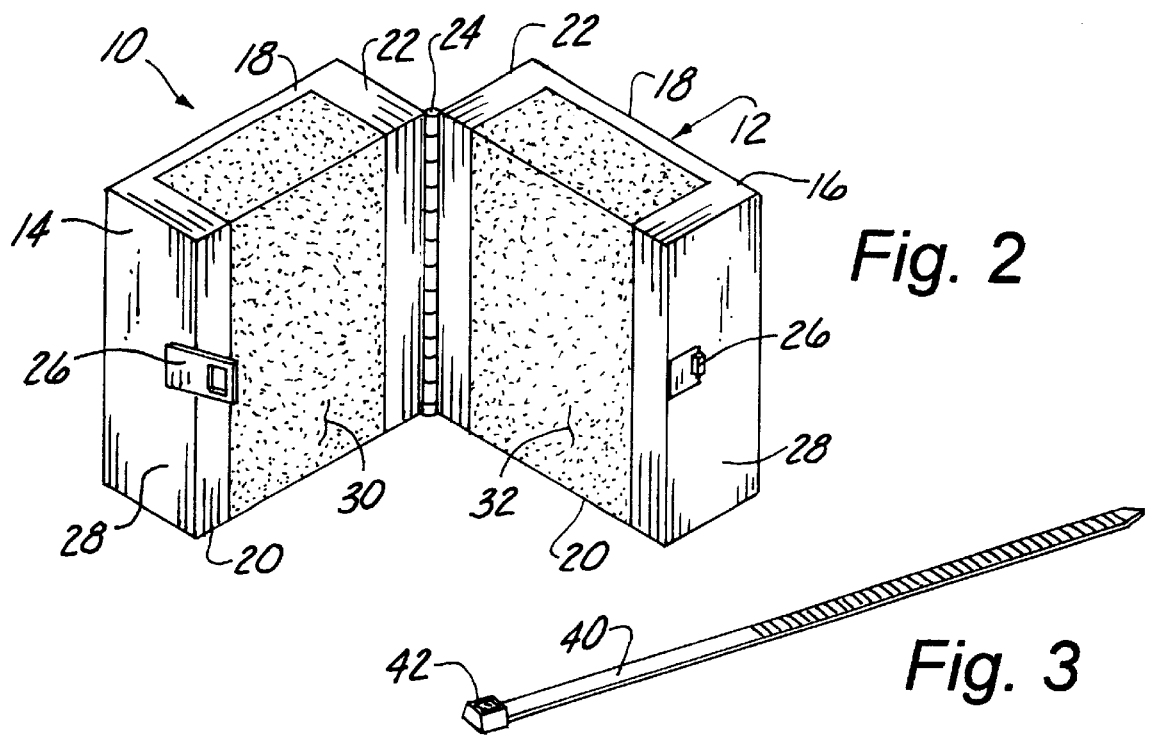
FIG. 2 is a perspective view showing the cable tie dispenser of FIG. 1 in an opened position for receiving a supply of cable ties.

As can be seen by reference to the drawings, and in particularly to FIGS. 1 and 2, the preferred embodiment of the cable tie dispenser of the present invention is designated generally by the reference number 10.

Figure 3:
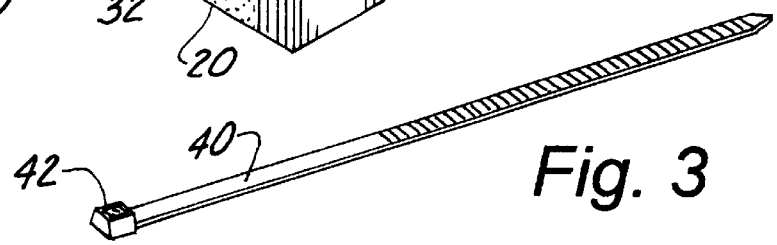
FIG. 3 is a perspective view showing a typical cable tie.

The preferred embodiment of the dispenser 10 is comprised of a book-like case 12 having a first half 14 and a second half 16 preferably having an overall length less than the length of a typical cable tie 40 (FIG. 3) such that the ends of the cable tie 40 extend past the top and bottom ends 18, 20 of the case 12. The case 12 may be made of any suitable semi-rigid material including metal, plastic or wood. The first and second halves 14, 16 of the case 12 are hingedly held together at a first end 22 by a hinge 24, such as by a typical common door hinge affixed to the two halves 14, 16, or alternatively by affixing a strip of flexible material to hold the two halves 14, 16 together, or alternatively, by integrally forming a hinge into the cover 12 as, for example, if the cover 12 is made of blow-molded plastic or die cast plastic or metal, etc.

A fastener 26 is located at a second end 28 of the case 12, such that the two halves 14, 16 can be fastened together in secured relation. The fastener 26 may include any suitable means for fastening two objects together including a latch, snap, buckle, tie, hook-and-loop fastener commonly referred to as Velcro®, or any other suitable means which those skilled in the art would recognize.

Disposed within each half 14, 16 of the case 12 are first and second compressible resilient members 30, 32 preferably made of synthetic foam or a packing material that has encapsulated air pockets—commonly referred to as bubble-pack, or any other material that is compressible and resilient. A belt clip 34 (FIG. 1) is preferably affixed to the back face 36 of the cover 12 for supportably securing the dispenser 10 to a belt 38 of the user.

In use, the dispenser 10 is loaded with a supply of cable ties 40 as illustrated in FIG. 4. The ties 40 are placed across one of the compressible resilient members 30, 32 preferably so that at least one end, such as the cable tie head 42, extends beyond the top end 18 of the case 12. The case 12 is then closed as indicated by arrow 44 (FIG. 4) and the two halves 14, 16 are secured together by the fastener 26. As the case 12 is closed and secured together, the compressible resilient members 30, 32 are forced to compress due to the volume of cable ties 40 disposed therebetween. The cable ties 40 are thereby firmly but removably restrained between the two compressed resilient members 30, 32. With the loaded dispenser 10 clipped over the user's belt 38 (FIG. 1) by the belt clip 34, the user can selectively grasp individual ties 40 for use. As the individual cable ties 40 are removed from the dispenser 10, the compressible resilient members 30, 32 expand to fill the void left by the removed cable ties. Thus, the compressible resilient members maintain a firm and substantially uniform pressure on all the remaining cable ties within the dispenser such that even the last cable tie remaining within the dispenser is firmly restrained and will not fall out of the dispenser until it is purposefully removed.

In an alternative embodiment as shown in FIG. 5, rather than having compressible resilient members disposed on opposing halves 14, 16 of the case 12, the book-type dispenser 10a includes a plurality of "pages" of compressible resilient members 50, such as synthetic foam or bubble-pack as described above. Each "page" of compressible resilient members 50 is preferably bound to the hinge 12. With this embodiment, a supply of cable ties 40 is loaded between the compressible resilient pages 50 as shown in FIG. 5. Thus, as described for the first embodiment, when the case 12 is closed and secured by the fastener 26, the compressible resilient members 50 maintain a firm and substantially uniform pressure on all the remaining cable ties within the dispenser 10a such that even the last cable tie remaining within the dispenser is firmly restrained and will not fall out of the dispenser until it is purposefully removed.

In yet another embodiment as shown in FIGS. 6–10, the dispenser is a roll-up type cable-tie dispenser 10b. The case 12 is comprised of a durable flexible panel 60, such as cloth, nylon, leather, etc. to which is secured an elongated compressible resilient member 62, such as synthetic foam or bubble-pack as described above.

As best shown in FIGS. 7–9, the elongated compressible resilient member 62 has first and second edges 64, 66, upper and lower edges 68, 70, and first and second faces 72, 74. The cable ties 40 are placed across the width and along the length of the elongated compressible resilient member 62 as illustrated in FIG. 9, preferably with the head 42 of the ties 40 extending above the upper edge 68 of the elongated compressible resilient member 62.

The flexible panel 60 includes a top and bottom 76, 78, first and second ends 80, 82 and interior and exterior faces 84, 86. A fastener 88, preferably Velcro®, although other fastening means such as snaps, buckles, tie strings, etc. are also suitable, are attached near the first and second ends 80, 82 of the panel 60. A belt clip 34 is attached to the exterior face 86 of the panel 60 by a cooperating mounting plate 92 contacting the interior face 84. The clip 34 is adapted to receive and be supported on a belt 38 (FIG. 10).

In use, the dispenser 10b is loaded with a supply of cable ties 40 as illustrated in FIG. 9. The ties 40 are placed across the width and along the length of the first face 72 of the elongated compressible resilient member 62 and tightly rolled up to form a cylindrical roll as shown in FIG. 7. Continued rolling of the elongated compressible resilient member 62 over and with the flexible panel 60 completes the cylindrical roll. The first and second ends 80, 82 of the panel 60 are then secured by the fastener 88. As similarly described above for the first and second embodiment, when the ties 40 are tightly rolled up into the elongated compressible resilient member 62 which is in turn tightly rolled up into the flexible panel 60 and prevented from unrolling and decompressing by being secured by the fastener 88, the compressible resilient member 62 maintains a firm and substantially uniform pressure on all the cable ties within the dispenser 10b such that even the last cable tie remaining within the dispenser is firmly restrained and will not fall out of the dispenser until it is purposefully removed.

Although only an exemplary embodiments of the invention have been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A method of holding a plurality of individual cable ties and dispensing at least one select individual cable tie from said plurality of individual cable ties, said method comprising the steps of:

providing an area of compressible resilient material;

providing a case to receive said area of compressible resilient material, said case having an open position and a closed position and being moveable therebetween, and wherein said case further includes a fastener;

opening said case to said open position thereby exposing said area of compressible resilient material;

placing a plurality of individual cable ties on said exposed area of compressible resilient material such that at least a portion of a length of said plurality of individual cable ties is disposed over said area of compressible resilient material and at least one end of each of said plurality of individual cable ties extends beyond an edge of said area of compressible resilient material;

closing said case around said area of compressible resilient material such that when said case is in said closed position said case compresses said compressible resilient material around at least a portion of said length of said plurality of individual cable ties;

securing said case in said closed position with said fastener; and grasping at least one select cable tie of said plurality of individual cable ties extending beyond said edge of said area of compressible resilient material, and pulling said at least one select cable tie to remove it from said closed case.

2. The method of claim 1 wherein said case is comprised of semi-rigid material.

3. The method of claim 2 wherein said case includes a first half and a second half hingedly connected on a first end.

4. The method of claim 3 wherein said fastener is disposed on an opposing second end of said case.

5. The method of claim 4 wherein said area of compressible resilient material includes a first compressible resilient member received in said first half of said case and a second compressible resilient member received in said second half of said case.

6. The method of claim 5 wherein at least a portion of said length of said plurality of individual cable ties is compressed between said first compressible resilient member and said second compressible resilient member when said case is in said closed position.

7. A cable tie dispenser for releasably holding at least a portion of a plurality of individual cable ties such that at least one of the cable ties may be selectively removed from the cable tie dispenser at a time wherein the cable tie dispenser a case including a first half and a second half hingedly connected together wherein each half has a first end, a second end, an open top, an open bottom and a hollow interior that extends from said top to said bottom a pair of compressible resilient members wherein each of said compressible resilient members is disposed within the hollow interiors of one of the first and second halves and adapted to selectively engage the top, bottom, or intermediate portions of the plurality of individual cable ties.

8. The cable tie dispenser as in claim 7 wherein, the resilient members disposed adjacent to one another when said case is in the closed position.

9. The cable tie dispenser as in claim 7 wherein, each of the resilient members extends from the top to the bottom of each half of said case.

10. The cable tie dispenser as in claim 7 wherein, the first half and the second half are hingedly connected along said first end.

11. The cable tie dispenser as in claim 10 wherein, the first half and the second half are provided with a cooperating fastener along said second end.

12. The cable dispenser as in claim 7 wherein, said case is comprised of a semi-rigid material.

13. The cable dispenser as in claim 7 wherein, one of said first half and said second half of said case are provided with a belt clip.

14. A method of holding a plurality of individual cable ties and dispensing at least one select individual cable fie from said plurality of individual cable ties, said method comprising the steps of:

placing a selected portion of each of said plurality of individual cable ties having a top portion, a bottom portion, and an intermediate portion into compressive engagement between a pair of resilient members disposed within a case having a first half and a second half hingedly connected together wherein each resilient member extends completely through the top and bottom of one of the halves of said case.

15. The method as in claim 14 wherein, said selected portion of each of said plurality of individual cable ties only includes the intermediate portion.

16. The method as in claim 14 wherein, said selected portion of each of said plurality of individual cable ties only includes the bottom portion.

17. The method as in claim 14 wherein, said selected portion of each of said plurality of individual cable ties only includes the top portion.

18. The method as in claim 14 wherein, said selected portion of each of said plurality of individual cable ties includes the top portion of a first group of selected cable ties and the bottom portion of a second group of selected cable ties.

19. The method as in claim 14 wherein, said selected portion of each of said plurality of individual cable ties includes the top portion of one group of selected cable ties and the intermediate portion of another group of selected cable ties.

20. The method as in claim 14 wherein, said selected portion of each of said plurality of individual cable ties includes the bottom portion of one group of selected cable ties and the intermediate portion of another group of selected cable ties.

21. The method as in claim 14 wherein, said selected portion of each of said plurality of individual cable ties includes the top portion of a first group of selected cable ties, the intermediate portion of a second group of selected cable ties, and the bottom portion of a third group of selected cable ties.

* * * * *

UNITED STATES PATENT AND TRADEMARK OFFICE
CERTIFICATE OF CORRECTION

PATENT NO.      : 6,343,693 B1
DATED           : February 5, 2002
INVENTOR(S)     : Finley, Allen D.

It is certified that error appears in the above-identified patent and that said Letters Patent is hereby corrected as shown below:

Column 4,
Line 58, after the word "having" and before the word "an" insert -- an open top and an open bottom for receiving said compressible resilient material and --.

Column 5,
Line 31, delete the word "A" and insert -- The combination of a plurality of cable ties and a --.
Line 46, after the word "ties" insert -- wherein at least a portion of a length of said plurality of individual cable ties is disposed over said area of compressible resilient material and at least one end of each of said plurality of individual cable ties extends beyond an edge of said area of compressible resilient material; and wherein, when said case is in said closed position said case compresses said compressible resilient material around at least a portion of said length of said plurality of individual cable ties such that when at least one select cable tie of said plurality of individual cable ties that extend beyond said edge of said area of compressible resilient material is pulled, said at least one select cable tie can be removed from said case when said case is disposed in the closed position --.

Column 6,
Line 18, after the words "second half" insert -- each provided with an open top and an open bottom and --.
Line 20, after the word "the" and before the word "top" insert -- open --.
Line 21, replace the word "one" with -- each --.

UNITED STATES PATENT AND TRADEMARK OFFICE
CERTIFICATE OF CORRECTION

PATENT NO. : 6,343,693 B1
DATED : February 5, 2002
INVENTOR(S) : Finley, Allen D.

It is certified that error appears in the above-identified patent and that said Letters Patent is hereby corrected as shown below:

<u>Column 6 contd.,</u>
Line 21, after the word "case" replace the period with a semi-colon, and insert
-- closing said case around said area of compressible resilient material such that when said case is in said closed position said case compresses said compressible resilient material around at least a portion of said length of said plurality of individual cable ties;
   securing said case in said closed position; and
   grasping at least one select cable tie of said plurality of individual cable ties extending beyond said edge of said area of compressible resilient material, and pulling said at least one select cable tie to remove it from said closed case. --

Signed and Sealed this

Tenth Day of September, 2002

Attest:

Attesting Officer

JAMES E. ROGAN
*Director of the United States Patent and Trademark Office*